(12) United States Patent
Vann

(10) Patent No.: US 6,168,331 B1
(45) Date of Patent: Jan. 2, 2001

(54) CASE KEYBOARD

(76) Inventor: Charles S. Vann, 1425 Drake Ave., Burlingame, CA (US) 94010

( * ) Notice: Under 35 U.S.C. 154(b), the term of this patent shall be extended for 0 days.

(21) Appl. No.: 09/464,594

(22) Filed: Dec. 16, 1999

(51) Int. Cl.⁷ .................................................. B41J 5/18
(52) U.S. Cl. ............................................. 400/472; 400/88
(58) Field of Search ........................ 400/472, 88; 341/22, 341/21; 345/169, 168, 172; 361/680

(56) References Cited

U.S. PATENT DOCUMENTS

| | | | |
|---|---|---|---|
| 4,939,514 | * | 7/1990 | Miyasaki ................................ 341/22 |
| 5,278,779 | * | 1/1994 | Conway et al. ...................... 400/472 |
| 5,574,481 | * | 11/1996 | Lee ....................................... 400/472 |
| 5,632,373 | * | 5/1997 | Kumar et al. ......................... 206/305 |
| 5,653,543 | * | 8/1997 | Abe ...................................... 400/489 |
| 5,818,357 | * | 10/1998 | Motoyama et al. .................. 400/472 |
| 5,941,648 | * | 8/1999 | Robinson et al. ................... 400/472 |
| 5,943,041 | * | 8/1999 | Allison et al. ....................... 400/472 |
| 6,088,220 | * | 7/2000 | Katz ....................................... 400/82 |

\* cited by examiner

*Primary Examiner*—John S. Hilten
*Assistant Examiner*—Anthony H. Nguyen

(57) ABSTRACT

The case keyboard is an input device that folds around an electronic instrument to protect it and provide ease of transport. Because of its small size and portability, the case keyboard is very practical for providing instructions to electronic instruments that are small in themselves, enabling both devices to be easily transported. The electronic instrument could be a personal digital assistant (PDA), small computer, calculator, telephone, or other portable machines. The first embodiment of the case keyboard has a standard set of keys on a substrate. The second embodiment uses a touch-pad switch to multiplex the character designation of a small set of keys and a gently motion of the thumb. The multiplexing reduces the number of keys while still providing designation of about 160 characters. Shorter finger-motions reduce the probability of repetitive stress injuries. A third embodiment incorporates the entire instrument into a case keyboard with a pop-up viewing screen flexibly attached.

1 Claim, 5 Drawing Sheets

CASE KEYBOARD

CROSS-REFERENCE TO RELATED APPLICATIONS

None.

BACKGROUND—FIELD OF INVENTION

This invention relates to keyboards, specifically to an improved version that substantially reduces size and weight while also functioning as a case for protection and transport of an electronic instrument.

BACKGROUND—DESCRIPTION OF PRIOR ART

Many types of electronic instruments require or benefit from human input devices such as a keyboard, for example, personal digital assistants (PDAs), cellular telephones, and palm-size computers. Advances in electronic miniaturization have allowed many of these electronic instruments to become much smaller in size for reasons of portability or space efficiency. However, keyboards have not kept pace with this size reduction because of the fixed size of the human finger.

For practical transport with a small electronic instrument, the keyboard should fit into a pocket or purse. Ideally, the keyboard would also function to protect and facilitate easy transport of the electronic instrument. Yet, a standard keyboard is many times larger than the portable electronic instruments. The standard keyboard usually has over 100 full-size keys, and dimensions on the order of 18" long, 7" wide×1 to 2" thick. A standard key is about the size of a finger-tip.

Several approaches have been used to reduce the size of a standard keyboard. One way is to make the keys smaller which is easily done. However, smaller keys are more difficult to press without inadvertently designating adjacent keys, making it too impractical and frustrating to type at a reasonable rate. Small tools such as a pen or wand can aid in typing with small keys, but they also are awkward and slow. Likewise, writing simplified characters such as script or graffiti with a pen is tedious, slow, and requires training. There are many products available with small key keyboards and pen typing devices.

Another way of reducing the size of a keyboard is to reduce the number of keys. However, this approach is limited by practicality. For common word processing, many different characters are required. As a practical minimum, about 60 dedicated keys are needed: 26 for each letter in the alphabet, 12 for numbers, 6 for punctuation, and about 16 for functions such as shift, control and tab.

Keyboards designed specifically to work with palm-size electronic instruments usually have fewer keys, and their size is reduced accordingly. For example, the GoType keyboard (patent pending) has 67 keys to operate a 3Com Palm Pilot PDA (LandWare Inc., PO Box 25, Oradell, N.J. 07649). However, the 10×4 inch area and 1 to 2 inch thickness of this keyboard is still large compared to the size of a palm-size electronic instrument.

Other approaches to reduce a keyboard's size include segmenting a standard number of keys such that the segments can be stacked, folded, compressed, or disassembled into a more easily transported configuration (U.S. Pat. Nos. 3,940,758, 5,044,798, 4,739,451). In general, these approaches do not reduce the volume of standard keyboard, only reconfigure its profile to make it more transportable. Therefore, the problem remains that the keyboard is impractical to carry in a pocket or purse.

Thus, even the smallest keyboard with full-size keys dominates the size of miniature electronic instrument, causing the electronic instrument in its entirety to be too bulky.

SUMMARY

In accordance with the present invention, a keyboard is made compact and multifunctional by making it into a case that surrounds an electronic instrument when in the transport mode. In addition to being easy to use and quick to set-up, the keyboard serves as a protective cover and facilitating transport of the electronic instrument.

DRAWING FIGURES

Reference is now made to the embodiments illustrated in FIGS. 1–5 wherein like numerals are used to designate like parts throughout.

Figure 1:
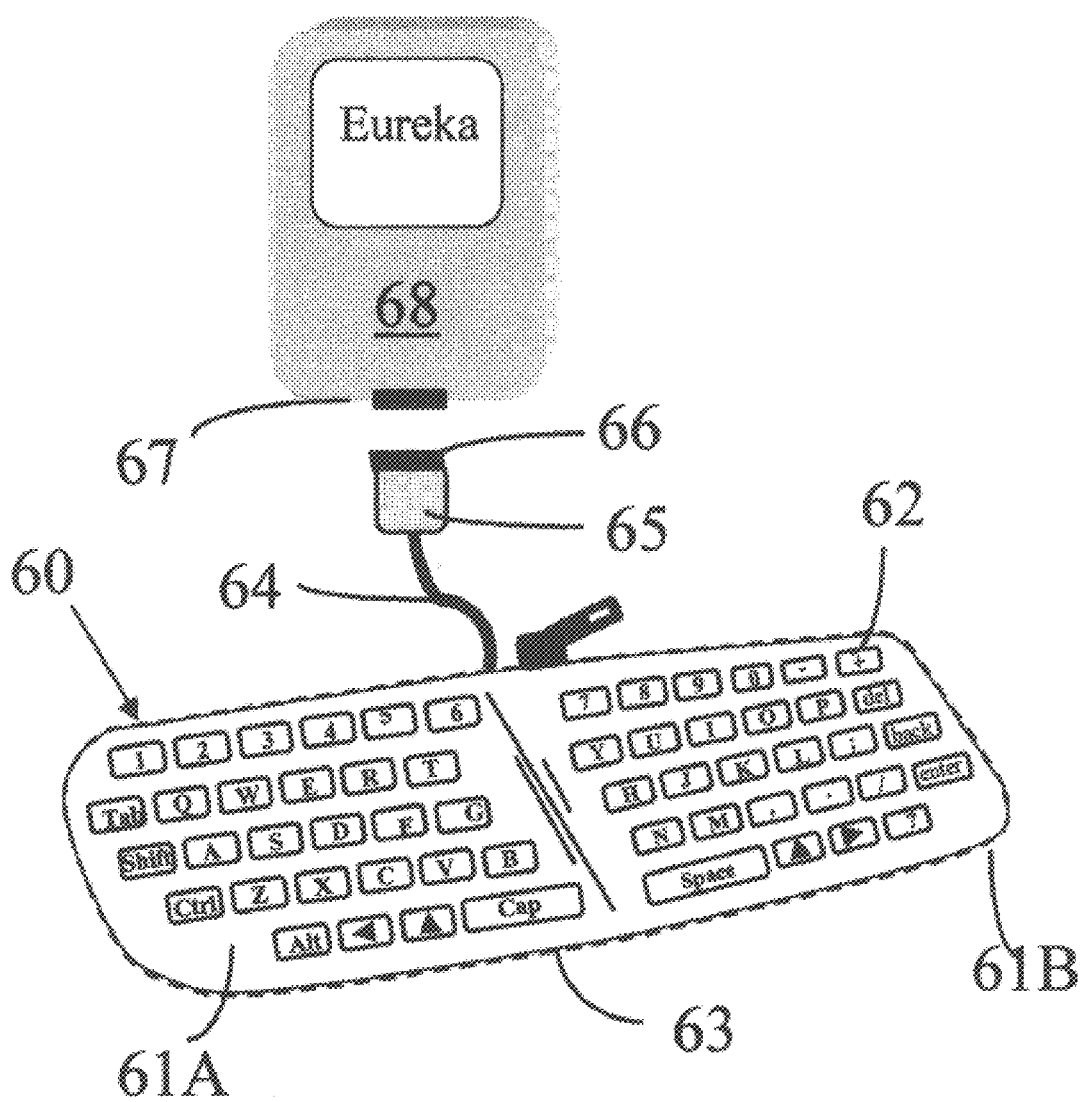
FIG. 1 is an isometric view of the first embodiment of a case keyboard in its operational mode.

REFERENCE NUMERALS IN DRAWING 60 first embodiment
61 substrate, A(left), B(right)
63 zipper
64 cable
65 electronics
66 keyboard connector
67 instrument connector
68 electrical instrument
70 base layer
71 bottom wire membrane
72 flat wire
73 spacer membrane
74 top wire membrane
75 top layer
76 Velcro sleeve
80 second embodiment,
81 second input device,
82 hinge

DESCRIPTION

Figure 2:
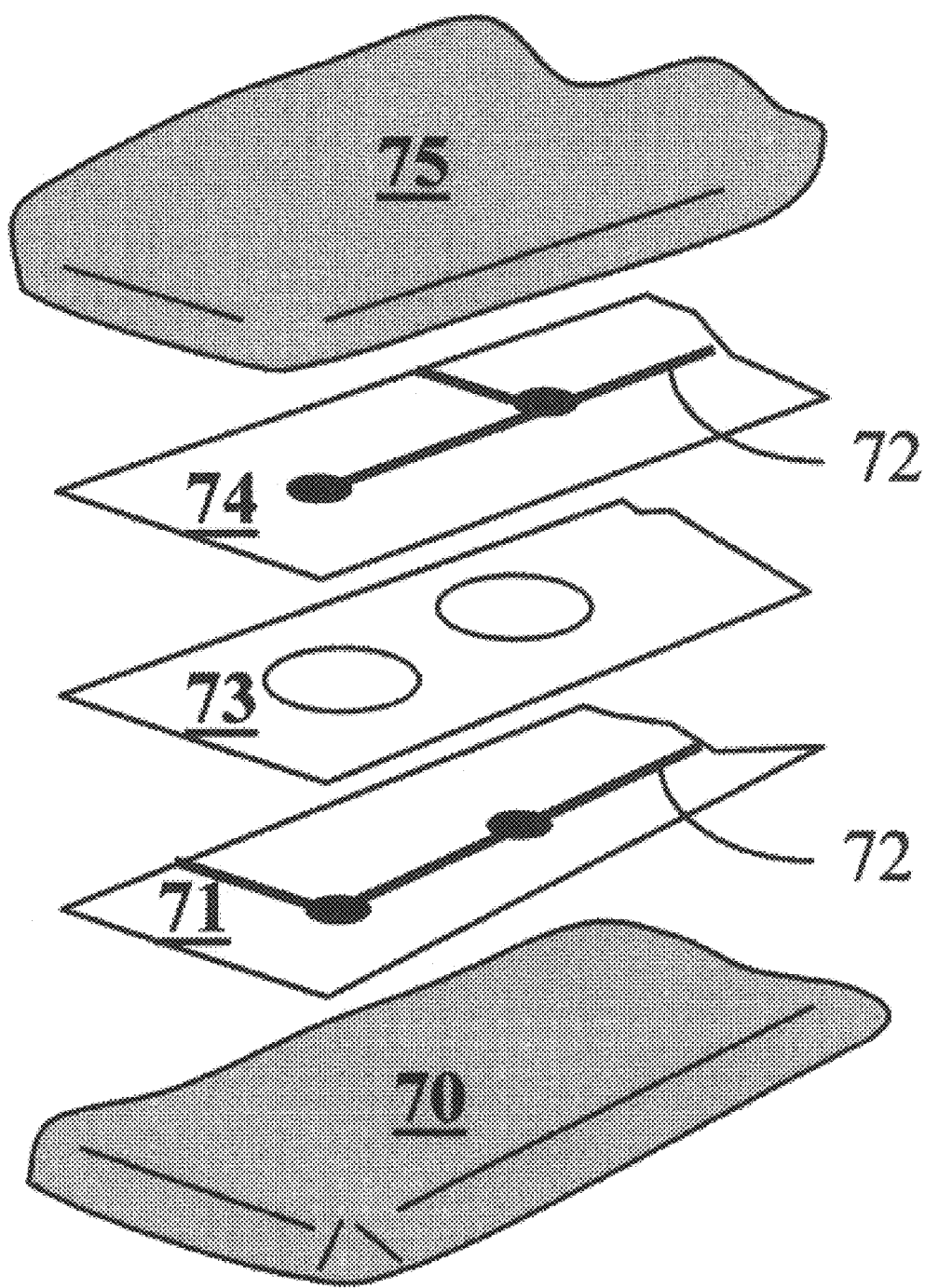
FIG. 2 is a isometric view of a flat key used in all three embodiments of a case keyboard.
Figure 3:
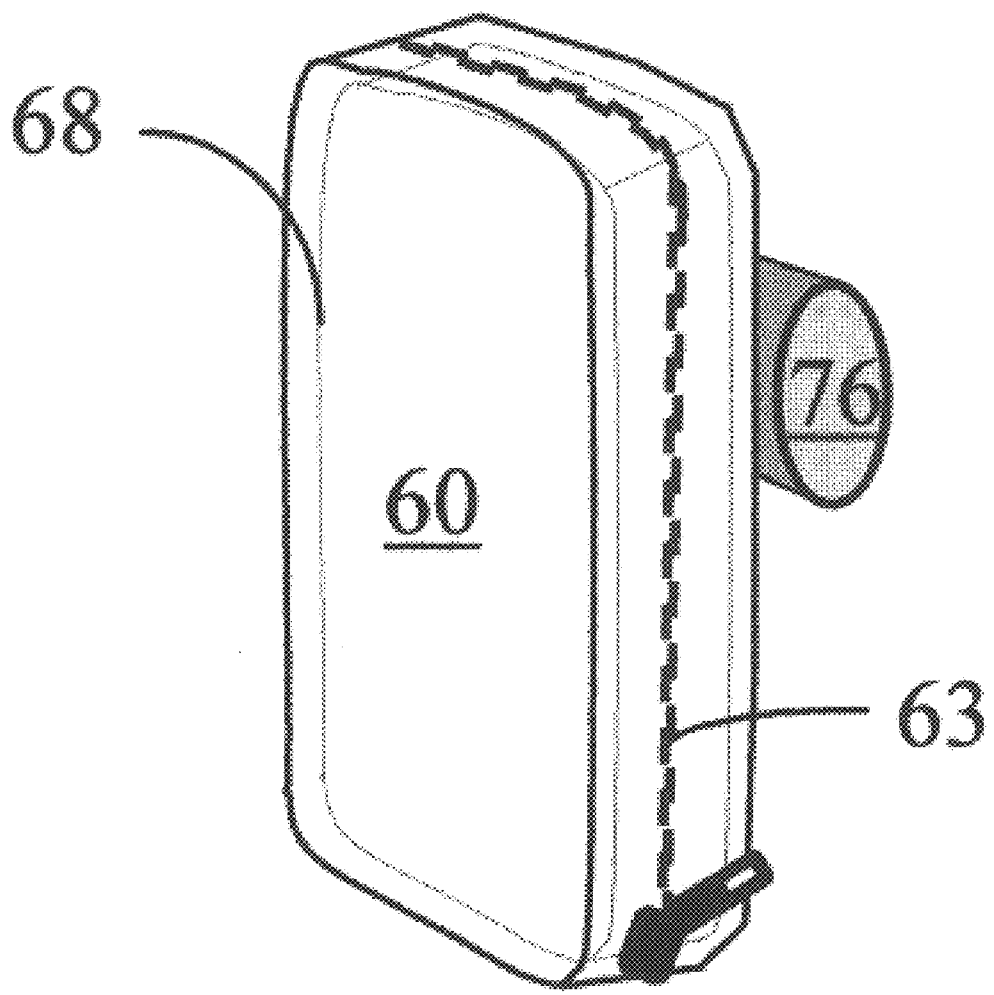
FIG. 3 is an isometric view of the first embodiment of a case keyboard in its transport mode.

FIGS. 1–3—Preferred Embodiment

Two different embodiments of a case keyboard are disclosed. When compared to standard keyboards, these embodiments use the keyboard as a protective and/or transport case for an electronic instrument. Furthermore, these embodiments use flat keys as a preferred means for a thin key board, although other types of keys could also be used, such as spring, membrane, light, or other conventional type keys. A key is defined as a finger-activated, switching means for the purpose of electrically designating a character or function to an electronic instrument.

The first embodiment of the case keyboard 60 is illustrated in FIG. 1 (operational mode), FIG. 2 (flat key), and FIG. 3 (travel mode). This embodiment 60 consist of a substrate 61, plurality of flay keys 62 in the substrate, a zipper 63, a cable 64, keyboard electronics 65 and an external connector 66.

FIG. 2 shows an exploded view of a flat key 62 embedded in substrate 61. The substrate 61 consists of base layer 70, a bottom wire membrane 71, flat wires 72, a spacer membrane 73, a top wire membrane 74, a top layer 75. Each key 62 is at a wire intersection of the top 74 and bottom 71 wire membranes. When finger pressure is applied to the top layer 75 at a key position 62, the flat wire 72 in the top wire membrane 74 is pushed through a hole in the spacer membrane 73 and into electrical contact with the flat wire 72 in the bottom wire membrane 71. The rigidity of the base layer 70 resists the finger pressure and aids in better electrical contact of the two flat wires 72. (The use of wire membranes and flat wires is well known in the art).

The top layer 75 can be a flexible material such as foam to provide some resistance to the finger motion. A small amount of key resistance allows the fingers to rest on the keys without inadvertent activation. Also, some key resistance provides a conventional (better) feel when typing. The base layer 70 can be made of either a soft (e.g. leather, rubber), or a hard material (e.g. plastic, metal).

When a finger motion forces electrical contact between the top and bottom wire membranes 71, 74, the electronics 65 interprets it as a desired designation of the character for the key 62 at that junction. The cable 64 is the means of connection between the keyboard electronics 65 and the flat wires 72 in the top and bottom wire membranes 71, 74. The electronics 65 are attached to a connector 66 that mates with a connector 67 in a electronic instrument 68.

FIG. 3 shows substrate 61 folded around an electronic instrument 68 for the purpose of protection or compact transport. The means of holding the substrate 61 around the electronic instrument 68 are many, for example, Velcro, belt, tape, string, snaps, or buttons. A preferred means of fixing is a zipper 63 that is sewn around the edge of the substrate 61. When the zipper 63 is completely zipped the substrate 61 surrounds the electronic instrument 68, protecting it from external objects. Furthermore, a Velcro sleeve 76 can be attached to a belt on the user such that Velcro on the back of the substrate 61 will support for transport a case 60 with an instrument 68 inside it. Also, a simple belt hook (not shown) could be attached to Velcro on the case 60 such that the case 60 could be hooked onto a belt for transport.

Figure 4:
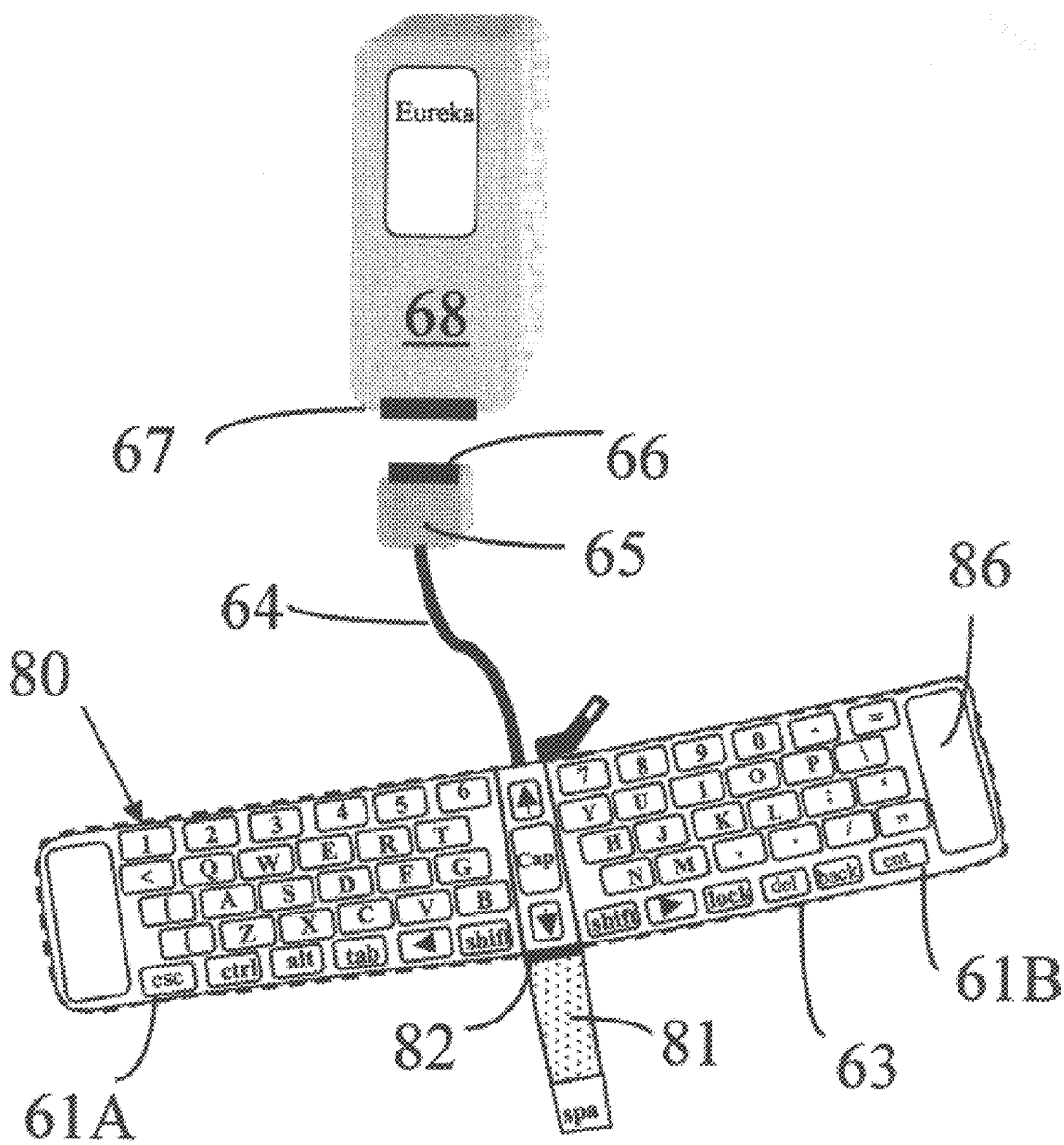
FIG. 4 is an isometric view of the second embodiment of a case keyboard in its operational mode.
Figure 5:
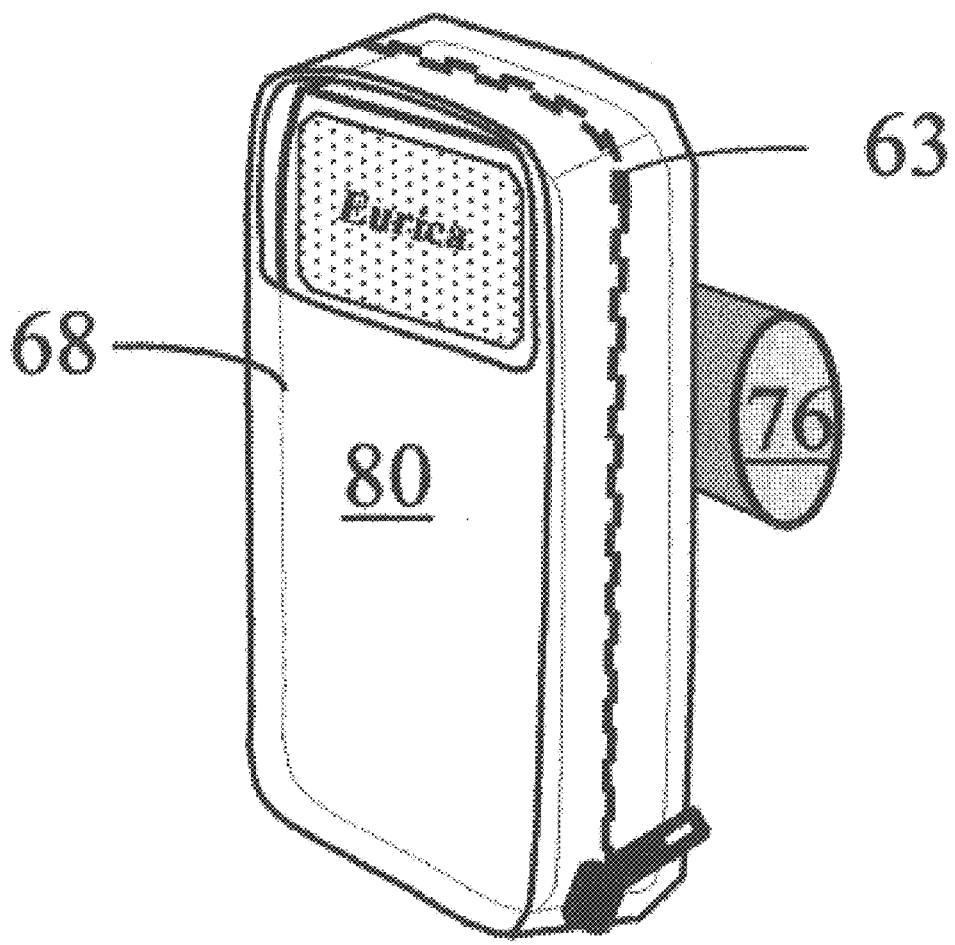
FIG. 5 is an isometric view of the second embodiment of a case keyboard in its transport mode.

FIGS. 4,5—Additional Embodiments

A second embodiment of the case keyboard is illustrated in FIG. 4 (operational mode), and FIG. 5 (travel mode). This embodiment 80 is similar to the first embodiment 60 in that it also consist of a substrate 61, a plurality of keys 62, a zipper 63, and a cable 64.

However, it further includes a second input device 81, attached to substrate 61 by a hinge 82, allowing it to rotate (flip) down from the center of the case into a more comfortable location closer to the user. Thin, thumb-activated input devices are well known in the art and are often called a 'touch-pad' cursor pointer. For example, the Easy Cat made by CIRQUE (U.S. Pat. Nos. 5,305,017; 5,339,213; 5,349,303; 5,565,658). These input devices are typically used for two-dimensional positioning of a cursor on a computer screen. Likewise, input devices 81 could position a cursor on a computer screen.

FIG. 5 shows a preferred arrangement of the second embodiment 80 ziped around an electronic instrument 68 for protection and ease of transport. When it is desirable to sometimes remove the electronic instrument 68 without the keyboard (such as a telephone), holes 86 may be made in the substrate 61, allowing the zipper 63 to be moved aside and the instrument 68 quickly extracted from the case 80. Otherwise, the zipper 63 prevents the instrument 68 from falling out of the case 80.

ADVANTAGES

From the description above, a number of advantages of my case keyboard are evident:

The case keyboard substantially reduces the size of an electronic instrument and keyboard combination, by using the keyboard as the protective and transport case for the electronic instrument. Using the keyboard as the case not only eliminates bulk, it protects the instrument, and it conveniently transports the keyboard in conjunction with the instrument, allowing quick and easy setup.

The flat keys reduce the thickness of the keyboard while allowing it to more easily conform to the shape of the electronic instrument. The thinner substrate further reduces the bulk of the case keyboard.

A second input device can be included, enabling the user to send two-dimensional position information to the instrument.

The first input device operates as a standard keyboard, and the second input device operates as a standard cursor positioner.

CONCLUSIONS, RAMIFICATIONS, AND SCOPE

The case keyboard enables practical transport of a keyboard with a small electronic instrument. Fast and convenient connection to the Internet from any place and any time is extremely valuable in today's fast moving information society. Presently, there are no easily-transportable input devices for practically extended writing of emails or surfing the web. This keyboard meets that need with its compact and readily accessible arrangement. Furthermore, it is multifunctional by providing protection and a convenient means of transport.

The miniature size of this keyboard will greatly enhance the value of many electronic instruments. For example, internet chips can now be incorporated into telephones, but their usefulness is limited by impractical telephone keypad. However, a case keyboard is small enough to be incorporated around a telephone such that a user can easily send e-mail messages, surf the network, write letters, etc. with their telephones. Likewise, this keyboard can make palm top computers, PDAs, calculators, etc. easier to use while also making them even more compact and convenient to carry.

This invention may be embodied in other specific forms without departing from the spirit of essential characteristics thereof. The present embodiments is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A foldable keyboard for inputting information into an electronic instrument, comprising:

a substrate having a first half and a second half sections which are foldable at a center line between the first half and the second half and a peripheral edge surrounding the first half and the second half sections, a plurality of switching means supported by and attached to the first half and the second half sections for the purpose of electrically designating a character or function into said electronic instrument, and means for securing attached to the peripheral edge including a zipper for enclosing the foldable keyboard and the instrument so as to protect the keyboard and the instrument from damage and for ease of transporting.

* * * * *